April 5, 1927.
T. C. JENSEN
1,623,414
AUTOMATIC WEIGHING SCALE
Filed May 18, 1925
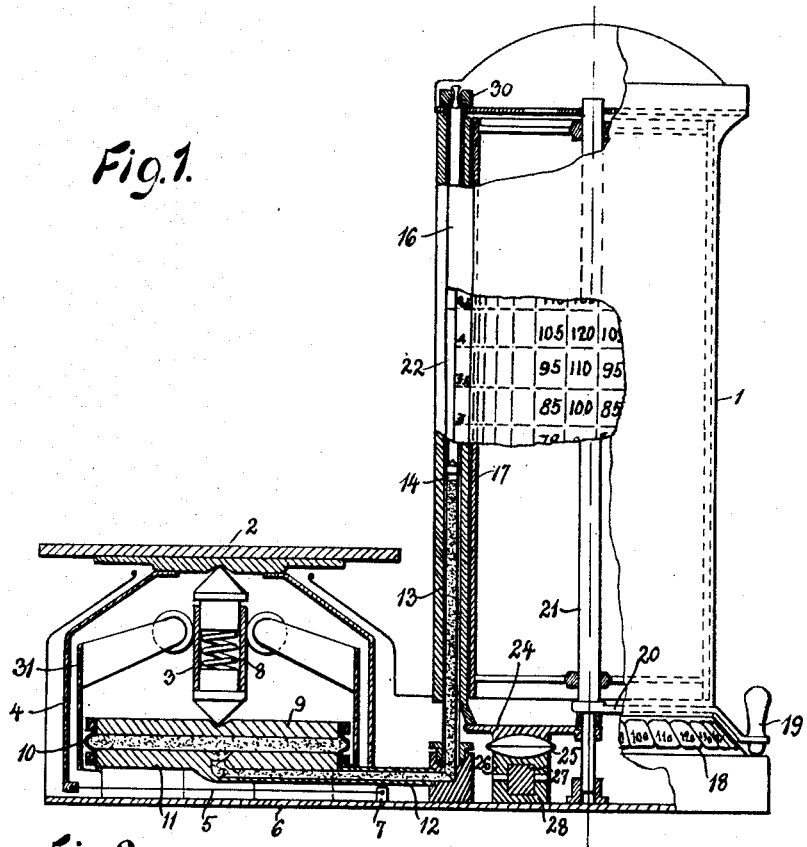
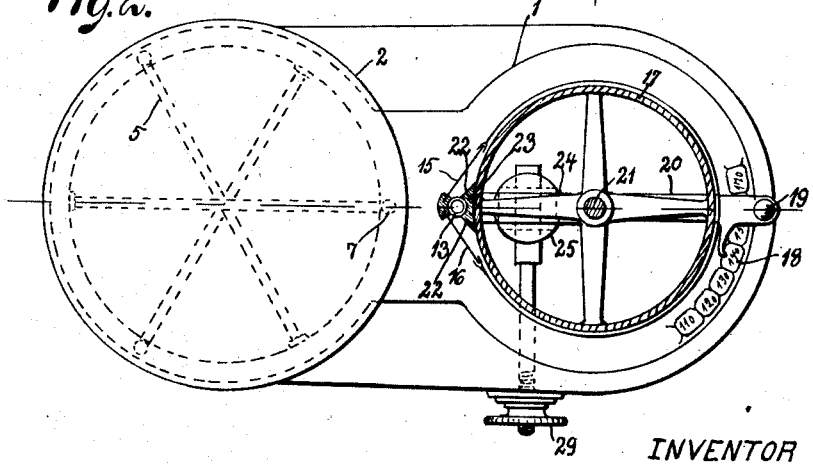
INVENTOR
Thomas Christian Jensen
By Emil Bönnelycke
Attorney.

Patented Apr. 5, 1927.

1,623,414

UNITED STATES PATENT OFFICE.

THOMAS CHRISTIAN JENSEN, OF COPENHAGEN, DENMARK, ASSIGNOR TO SCANDINAVIAN EXPORT AGENCY LTD., OF COPENHAGEN, DENMARK.

AUTOMATIC WEIGHING SCALE.

Application filed May 18, 1925, Serial No. 31,165, and in Denmark May 20, 1924.

The present invention relates to an automatic scale for weighing goods, and the main feature of which consists in this that the pressure (force of gravity) of the goods to be weighed is balanced by a column of fluid.

A form of execution of a scale according to the invention is shown on the drawing, where—

Fig. 1 is a vertical section, with parts in elevation of the scale, and

Fig. 2 is a part-sectional plan view thereof.

The scale comprises a frame (1) and a tray (2) suspended on a supporting member (3) pointed at both ends, which tray is provided with a bell-shaped guide (4) connected by three horizontal rods or bands (5) to three pins (7) secured to the bottom plate (6) at equidistant points with relation to each other and to the center of said plate. By this arrangement the tray is prevented from tilting if the goods be not placed centrally on same. To counteract detrimental effects of sudden shocks due to the goods being suddenly placed upon the tray, the upper part of the supporting member (3) is slidable in the lower part, a spring (8) being interposed between the two parts to take up the said shocks. The supporting member (3) rests on a float (9) which is connected by an elastic annular member (10) to a bottom member (11); and this member (11) has joined to it a connecting pipe (12), to supply the fluid, such as mercury, which fills the space formed between the members (9), (10) and (11), to a rising pipe (13) of glass and containing a float (14) provided with an index. The cylindrical vertical part of the frame (1) is provided on either side of the pipe (13) with glass plates (15) and (16) and has inside a vertical drum (17) carrying the price dials, the single prices being arranged in pairs of identical rows on the dial and at such a distance from each other that they may be read simultaneously through both glass plates (15) and (16). The base of the frame (1) is provided with a price dial (18) according to which the drum (17) can be set by hand by means of the handle (19) which is connected to the shaft (21) of the drum by means of a bar (20). The weight indications (22) are arranged on each side of the pipe (13) on a member (23) extending along the pipe (13) through the whole length of the drum (17) and, like the latter, is made of a substance, such as vulcanized fiber, having the same longitudinal expansion as that of the fluid column. The drum shaft (21), with the weight scale bar (23), rests on a support (24) which in turn rests on an elliptical closed box (25) filled with a fluid the expansion of which at temperature changes corresponds to the moving of the zero point in the pipe (13). The box (25) rests on a member (26) and between this member and a member (28) secured to the bottom plate (6) there is inserted an adjusting wedge (27) extending through the base of the frame and provided outside the base with an adjusting nut (29) by means of which the dials and thus the scale can be adjusted vertically. A valve (30) is provided in the top of the pipe (13), which valve, during transport, can be locked in its closed position and, when the scale is in use, can operate as a reverse valve and can close in case the fluid reaches the top of the pipe. A ring (31) secured to the bottom member (11) carries arms provided with rollers for guiding the supporting member (3) in its vertical movements.

I claim:

1. A hydrostatic scale, comprising a depressible platform; a vertically-disposed rising-and-falling column of liquid under the control of the platform; a float supported on the top of the liquid column and provided with an index; and a dial across which said column moves having graduations with which the index on said float directly coacts.

2. In a scale, a depressible platform; a vertical support having a pointed upper end whereon the platform immediately rests; and means for preventing tilting of the platform, embodying a guide within which the support is disposed, and one or more horizontal members arranged below said support and connected to said guide.

3. In a scale, a depressible platform; a vertical support having a pointed upper end whereon the platform immediately rests; and means for preventing tilting of the platform, embodying a bell-shaped guide within which the support is disposed, and a plurality of diametrically-intersecting, horizontal rods disposed below said support and connected to the lower edge of said guide.

4. In a scale, a depressible platform; and a vertical support therefor, said support embodying upper and lower telescopically-arranged members and an interposed cushioning spring, the upper member having a pointed end whereon the platform immediately rests.

5. A hydrostatic scale, comprising a depressible platform; a vertical support therefor; an expansible and contractible receptacle whereon said support immediately rests, said support having both ends pointed; a vertically-disposed, rising-and-falling column of liquid communicating at its bottom with the interior of said receptacle; and a graduated dial cooperative with the top of said column.

6. A hydrostatic scale, comprising a depressible platform; a vertical support therefor; an expansible and contractible receptacle whereon said support immediately rests; means for preventing tilting of the platform embodying a guide within which the support is disposed, and one or more horizontal members arranged below said support and connected to said guide; a vertically-disposed, rising-and-falling column of liquid communicating at its bottom with the interior of said receptacle; and a graduated dial cooperative with the top of said column.

7. A hydrostatic scale, comprising a depressible platform; a vertical support therefor; an expansible-and-contractible receptacle whereon said support immediately rests; a vertically-disposed, rising-and-falling column of liquid communicating at its bottom with the interior of said receptacle; a float supported on the top of the liquid column and provided with an index; and a dial across which said column moves having graduations with which the index on said float directly coacts.

8. In a scale, a vertically-disposed rotary drum having price indications marked thereon in pairs of parallel vertical rows, the figures in the two rows of each pair being duplicates of each other, and the rows of each pair being spaced from each other; a fixed ring disposed coaxial with said drum and bearing price indications; means for rotating the drum to set it with relation to said ring; and a vertical scale bar fixed with relation to said scale and adapted to occupy a position opposite the space between the two rows of a selected pair of rows.

9. A scale, according to claim 8, in which a body, expansible and contractible under the influence of temperature changes, is provided to support directly both the drum and the vertical scale bar, and thereby adjust them in accordance with such changes.

10. A hydrostatic scale, comprising a depressible platform; a vertical support therefor; a vertically-disposed, rising-and-falling column of liquid under the control of the platform; a vertically-disposed scale drum having graduations for coaction with the upper end of the liquid column; and an expansible and contractible body for supporting said drum and adjusting it vertically in accordance with the expansion and contraction of the liquid column due to temperature changes.

In testimony whereof I affix my signature.

THOMAS CHRISTIAN JENSEN.